United States Patent [19]
Back et al.

[11] Patent Number: 5,607,653
[45] Date of Patent: Mar. 4, 1997

[54] PROCESS AND APPARATUS FOR OXIDIZING AND NEUTRALIZING CAUSTIC WASTE TO LIQUID FERTILIZER

[75] Inventors: Dwight D. Back, Rockledge; Lawrence R. Grzyll, Merritt Island; Charlie Ramos, Satellite Beach; Nidal A. Samad, Palm Bay, all of Fla.

[73] Assignee: Mainstream Engineering Corporation, Rockledge, Fla.

[21] Appl. No.: 405,247

[22] Filed: Mar. 17, 1995

[51] Int. Cl.⁶ .................................................. C01B 21/00
[52] U.S. Cl. ................. 423/235; 423/242.1; 423/243.08; 71/32
[58] Field of Search .......................... 71/32, 59; 423/235, 423/212, 242.1, 243.02, 243.08

[56] References Cited

U.S. PATENT DOCUMENTS

| | | | |
|---|---|---|---|
| 3,711,269 | 1/1973 | Curless | 71/36 |
| 3,992,513 | 11/1976 | Petkau et al. | 424/1 |
| 4,013,443 | 3/1977 | Schuman | 71/31 |
| 4,247,321 | 1/1981 | Persinger | 71/59 |
| 4,603,036 | 7/1986 | Botton et al. | 423/235 |
| 5,017,348 | 5/1991 | Lerner | 423/235 |
| 5,211,735 | 5/1993 | Costa et al. | 71/40 |

OTHER PUBLICATIONS

Colorimetric Microdetermination of Nitrogen Dioxide in the Atmosphere, Bernard E. Saltzman, U.S. Dept. of Health, Education & Welfare, Analytical Chemistry, pp. 1949–1954.
Fluid Mixing Technology, James Y. Oldshue, Mixing Equipment Co., Inc., Chemical Engineering, McGraw-Hill Publications Co., 5 sheets of pages.
Rate Constants of Reactions of Ozone with Organic and Inorganic Compounds in Water –III, J. Hoigne, H. Bader, W. R. Haag and J. Staehelin, Swiss Federal Inst. for Water Resources and Water Pollution Control, p. 993 and and pp. 998–999.

Primary Examiner—Janet C. Baxter
Assistant Examiner—Amy M. Harding
Attorney, Agent, or Firm—Evenson, McKeown, Edwards & Lenahan, P.L.L.C.

[57] ABSTRACT

A process and apparatus for treating and detoxifying salts-hydroxides scrubber wastes containing nitrite salts or sulfite salts so that the final product has low nitrite or sulfite content, a neutral pH and is usable either as a base blend or as a stand-alone liquid product for agricultural applications. One approach is to have a continuous flow oxidation of the waste solution by ozone followed by a neutralization step with MKP. Another approach is to perform oxidation and neutralization in one step by the addition of hydrogen peroxide and MKP.

12 Claims, 4 Drawing Sheets

PROCESS AND APPARATUS FOR OXIDIZING AND NEUTRALIZING CAUSTIC WASTE TO LIQUID FERTILIZER

The U.S. Government has a royalty-free license in this invention as provided for by the terms of Contract No. F04611-93-C-0091 awarded by Phillips Laboratory, OLAC PL/RKFE.

BACKGROUND AND SUMMARY OF THE INVENTION

The present invention relates to a process and apparatus for treating and detoxifying nitrite- and sulfite-containing caustic scrubber waste to a chemical form suitable for land application such as fertilizer or direct disposal. In particular, the process and apparatus of the present invention oxidizes nitrites and sulfites to nitrates and sulfates, respectively, and neutralizes the resulting solution to neutral pH's near 7. The process as described can be carried out in situ with existing $NO_x$ and $SO_x$ scrubber systems, or on stored scrubber waste.

Dinitrogen tetroxide ($N_2O_4$) is used at East and West Coast space launch facilities as hypergolic fuel, but the liquid waste generated by the $NO_x$ scrubbers associated with those facilities poses a serious environmental problem. Industrial processes such as fired process heaters, fossil fuel fired boilers, production of nitric acid, and IC engine exhausts also have the potential of producing environmentally dangerous $NO_x$ and $SO_x$ emissions. Scrubber waste can also produce $NO_x$ emissions which makes the waste extremely hazardous since the OSHA STEL is 1 ppm.

Previous processes for treating and detoxifying wastes used strong acids such as nitric acid which made the final pH of the waste difficult to control and rendered the final product unsuitable for direct disposal unless additional treatment steps were taken for pH adjustment.

A process described in U.S. Pat. No. 5,206,002, for example, removes $SO_x$ and $NO_x$ gas by oxidation in the gas-phase, absorbs the oxidized species into solution, and then neutralizes the solution. This process does not, however, treat existing waste. The scrubbing of $SO_x$ and $NO_x$ streams is also known from U.S. Pat. Nos. 3,473,298; 4,784,835; 4,799,941; and 4,999,167.

Processes for the treatment of gas streams containing nitrogen oxides have also been described in U.S. Pat. Nos. 4,603,036 and 5,017,348 which use absorption of nitrogen oxides into an aqueous solution of hydrogen peroxide with the subsequent conversion of the nitrogen oxides to acids. The absorption solution in these known processes is acidic, and the final solution is not neutralized for disposal.

Other processes for the production of liquid fertilizer are described in U.S. Pat. Nos. 3,711,269; 4,013,443; and 5,211,735 which utilize reactions which include phosphoric acid, sulfuric acid, monobasic potassium phosphate (MKP), and ammonia. These conventional processes do not use MKP for the neutralization of salts-hydroxide strictly for the production of neutralized solution to be applied as liquid fertilizer.

It is an object of the present invention to provide a method and apparatus which produce a final product with high potassium and phosphate content directly suitable as liquid fertilizer or a base blend substrate for liquid or solid fertilizer.

It is another object of the present invention to produce a final product of neutral pH and low nitrite or sulfite content which is suitable to meet local, state, and federal EPA regulations for direct sewage disposal.

The foregoing objects have been achieved by the use of processes for detoxifying nitrite ($NO_2^-$) and sulfite ($SO_3^{2-}$) containing salts-hydroxides (e.g., NaOH, KOH, $Ca(OH)_2$) first by oxidation of the nitrites and sulfites to nitrates ($NO_3^-$) and sulfates ($SO_4^{2-}$), respectively, and second by the subsequent neutralization of the salts-hydroxide to a final neutral pH.

An advantage of the method of the present invention is that it is also applicable to most sulfite, nitrite, $NO_x$, and $SO_x$ by-product streams which are prevalent in commercial processes. Consequently, the detoxification processes described herein, along with a scrubber operation such as that used in the launch scrubbers, can eliminate or at least greatly reduce environmental $NO_x/SO_x$ emissions.

More specifically, processes which we have found to oxidize and neutralize a caustic waste solution containing $NaNO_2$, $NaNO_3$, and NaOH comprise a first process (a) on which there is a continuous flow oxidation of the waste by ozone ($O_3$) followed by a neutralization step with $KH_2PO_4$, or monobasic potassium phosphate (MKP); and, alternatively, a second process (b) comprising a one-step oxidation and neutralization with the addition of $H_2O_2$ and MKP.

The first-mentioned process is amenable to batch treatment or continuous flow gas-liquid contacting towers, and to direct integration into scrubber system operations with the addition of ozone in the $NO_x$ scrubber stream. The details of these processes also include configurations which provide a "secondary" scrubber safeguard against $NO_x$ emissions (OSHA STEL of 1 ppm) utilizing additional scrubber waste vessels connected in series with the primary treatment vessel.

A summary of the reactions involved in the first-mentioned process in accordance with the present invention is as follows:

(A) Oxidation

$$NO_2^- + O_3 \leftrightarrow NO_3^- + O_2 \quad [1]$$

$$SO_3^- + O_3 \leftrightarrow SO_4^- + O_2 \quad [2]$$

(B) Neutralization

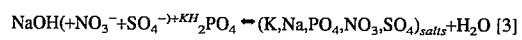
$$NaOH(+NO_3^- + SO_4^-) + KH_2PO_4 \leftrightarrow (K,Na,PO_4,NO_3,SO_4)_{salts} + H_2O \quad [3]$$

The second-mentioned detoxification process offers simplified treatment which does not require ozone. The emission of any $NO_x$ resulting from the waste acidification is trapped in a "secondary scrubber" vessel of untreated scrubber waste or redirected to an $NO_x$ scrubber tower.

The reactions summarizing the second-mentioned treatment process in accordance with the present invention are as follows:

(A) Oxidation

$$NO_2^- + H_2O_2 \leftrightarrow NO_3^- + H_2O \quad [4]$$

$$SO_3^- + H_2O_2 \leftrightarrow SO_4^- + H_2O \quad [5]$$

(B) Neutralization

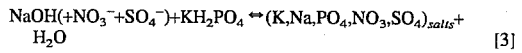
$$NaOH(+NO_3^- + SO_4^-) + KH_2PO_4 \leftrightarrow (K,Na,PO_4,NO_3,SO_4)_{salts} + H_2O \quad [3]$$

The neutralization step of both processes produces a fertilizer with high potassium and phosphate content which can serve as a base blend or as a stand-alone liquid product for numerous agricultural applications. The acid utilized in the process, namely monobasic potassium phosphate (MKP), is a solid characterized by low toxicity, low cost, and p$K_a$'s which provide for a controlled neutralization process resulting in fertilizer having a pH of approximately 7.

A further advantage is that the detoxification of scrubber waste can be accomplished at ambient temperatures and pressures, with commercially available equipment such as mixing tanks, mixers, ozone generators, and associated valves and fittings. The $NO_x$ emissions resulting from the oxidation and neutralization steps can be controlled below 1 ppm (by volume), the current OSHA STEL.

We have also discovered that the neutralization process of nitrite-containing waste must result in pH's slightly basic (greater than 7) in order to mitigate the evolution of toxic $NO_x$. When the pH of nitrite containing solutions drops below a pH of 7, nitric oxide can be produced to react with oxygen in the air and produce $NO_2$ and other nitrogen oxides ($NO_x$) as follows:

(a) evolution of NO from solution

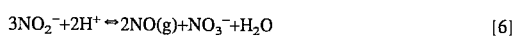

[6]

(b) production of "$NO_x$" gases

[7]

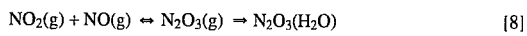

[8]

The process of the present invention minimizes the above reactions (Equations 6 through 8) first by oxidizing the nitrites and then neutralizing the reaction product to a pH greater than 7 so as to minimize the NO release described in Equation 6 as the increased concentration of $H^+$ shifts the reaction to the right.

The final product of the oxidation and neutralization process of the present invention is usable, as noted above, for direct land application or disposal. Liquid fertilizers have become a viable source of agricultural nutrient addition. Consequently, the conversion of the scrubber waste to a usable fertilizer form potentially provides for at least part of the cost recovery of the scrubber operation and detoxification processes.

There is a particularly high demand for fertilizer with the potassium content being similar to the phosphorous content as noted in U.S. Pat. No. 3,711,269. Fertilizer is typically rated as to its nitrogen, phosphorous, and potassium content, N-P-K. The numbers are weight per cent expressed for the composition of N as atomic nitrogen, the equivalent of P as $P_2O_5$, and the equivalent of K as $K_2O$. The neutralized waste stock generated by the methods of the present invention produce liquid fertilizer with potassium ($K_2O$) to phosphorous ($P_2O_5$) ratios of 1 to 1.5. Higher final concentrations of potassium are possible for scrubber waste solutions comprised of potassium hydroxide. Without departing from the principles of the present invention, low N content can be augmented by addition of urea and ammonium nitrate, as is commonly practiced in the fertilizer industry, to produce a "complete" fertilizer.

Definitions for certain terms used throughout this Specification are as follows:

Salts-Hydroxide or Caustic: Solutions comprised of hydroxides such as $Ca(OH)_2$, KOH, and NaOH, with pH's generally at 12 or higher. Caustic solutions are used in effluent scrubbing operations due to their reactive capabilities of removing $SO_x$ and $NO_x$ gas producing sulfites and nitrites in solution, respectively.

$NO_x$: A collective term used to describe the family of nitrogen oxide gases. These gases are generally produced from nitric oxide NO and subsequent oxidation with oxygen in air. Nitrogen dioxide $NO_2$ is one of the more toxic oxides with an OSHA STEL of 1 ppm.

Liquid Fertilizer: Aqueous solutions containing varying weight percents of nitrogen, potassium, and phosphorous for use in land application fertilization. Liquid or solid fertilizer is generally rated in weight percent as to its total nitrogen content N, total potassium content K as $K_2O$ equivalent, and total phosphorous content P as $P_2O_5$ equivalent, and expressed as N-P-K.

MKP: Monobasic potassium phosphate, or $KH_2PO_4$; molecular weight 136.085.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1A:
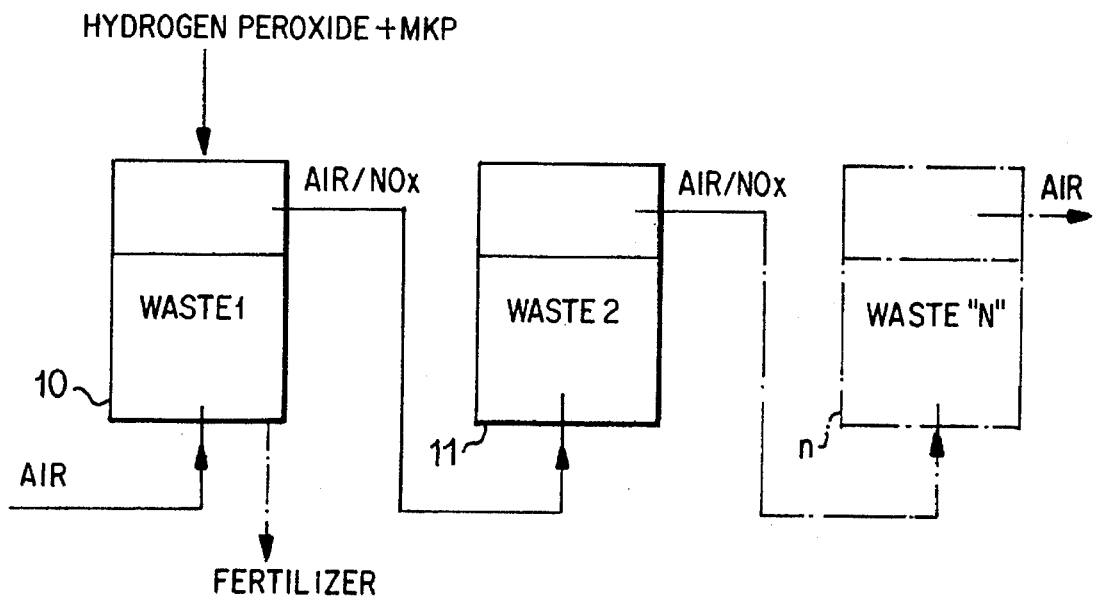
FIG. 1a is a schematic flow chart of a single-step hydrogen peroxide/MKP oxidation and neutralization process.

In FIG. 1a, hydrogen peroxide and MKP are added to a waste solution (Waste 1) containing the sulfites and/or nitrites in a primary vessel 10. The waste solution is continuously purged with compressed air and mixed by a conventional impeller of the type used in the batch reactor of FIG. 1b. After the hydrogen peroxide and MKP are added, the vessel is closed and the detoxification reaction proceeds. Due to the toxic nature of $NO_x$, the vessel must be located in a well-ventilated area or in a fume hood to comply with all local and federal regulations.

The primary waste solution vessel 10 can be connected in series with other waste solution vessels 11, . . . , n so that any $NO_x$ emissions resulting from the pH lowering of the hydrogen peroxide/MKP reaction are carried by the air purge to the next series-connected reactor. The additional reactors, 11 through n, in FIG. 1a contain scrubber waste just as the primary waste vessel and all equipped with sparge rings and impeller mixers. The air carrier stream purging vessel 10 will also carry air and any evolved $NO_x$ from vessel 10 to vessel 11 and so on to vessel . . . n. Consequently, the salt-hydroxide in vessels 11 through n will continue to scrub $NO_2$ leaving the primary reactor 10 by the scrubber reaction $$2NaOH + 2NO_2 \leftrightarrow NaNO_2 + NaNO_3 + H_2O \quad [9]$$

This process adds additional nitrites and nitrates to the secondary reactors already containing nitrites, nitrates, and salts-hydroxide of the original scrubber waste. Depending on the number of secondary reactors or vessels 11 through n placed in series with the primary reactor 10, the $NO_x$ emissions can be reduced to levels of 1 ppm or less as demonstrated. By appropriate valving and sequencing arrangements in a full-scale automated application, the secondary reactors 11 through n could be moved up in the reactor train to a primary reactor position as the previous primary vessel 10 is taken off-line following complete oxidation and neutralization. Thus, reactor 11 would become the primary reactor with reactor n now being filled with untreated scrubber waste to serve as the last secondary reactor in the series. The final $NO_x$ emission leaving the train of n reactors must be monitored or verified to meet all local and federal emissions guidelines.

Figure 1B:
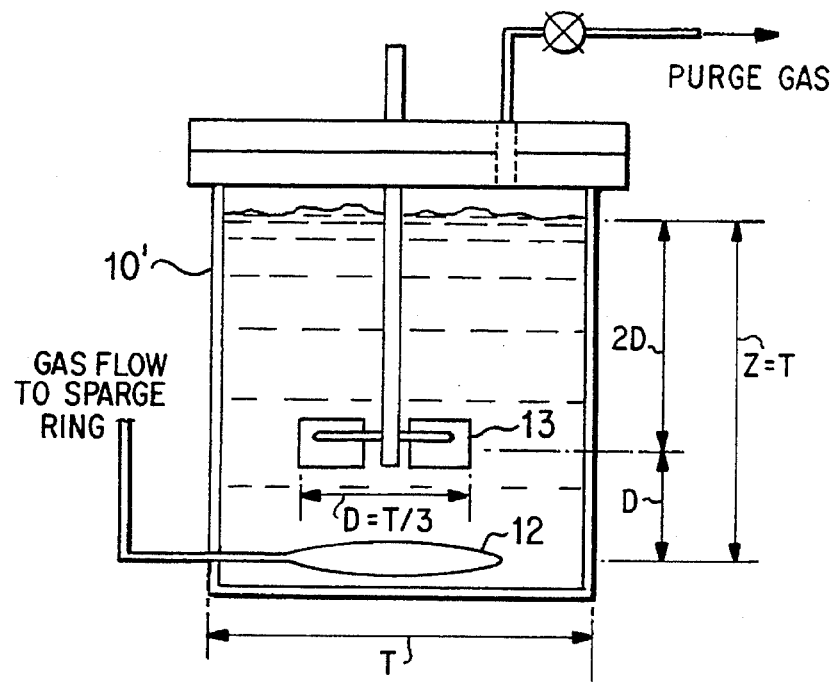
FIG. 1b is a schematic of a batch reactor equipped with sparge tube and impeller.
Figure 2:
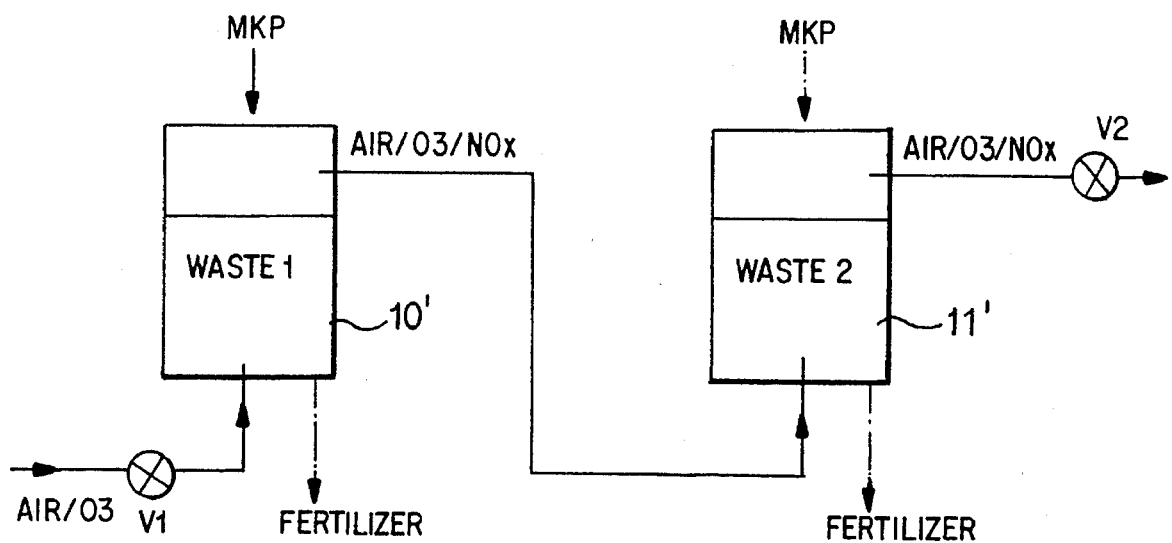
FIG. 2 is a schematic flow chart of dual-step ozone oxidation and MKP neutralization process.

FIG. 2 illustrates the ozone oxidation and MKP neutralization process whereby ozone contained in an air or oxygen stream is admitted through a conventional sparge ring 12 at the bottom of the closed, primary reactor vessel 10' and dispersed via a conventional radial flow impeller 13 (FIG. 1b). The relationships between the liquid level 2 in the vessel 10', the impeller diameter D and the tank diameter T are also shown in FIG. 1b. During the oxidation process, the unreacted ozone sparged through the primary reactor and contained in the air sparge stream can be directed into a sparge tube of a secondary reactor, vessel 11', containing additional scrubber waste. As measured, all of the ozone sparged through the primary reactor 10' will not react with the nitrites in solution due to mass transfer limitations, so secondary reactors 11' and so on provide for more efficient use of the ozone. After completion of the oxidation step for primary vessel 10', the neutralization step with MKP is initiated with the secondary vessel 11' still in line with an air purge continuing through both vessels 1' and 11'. The vessel 10' is opened, MKP is added, the vessel is resealed, and the vessel is sparged with air and mixed by the impeller 13. In accordance with Equation 6 above, lowering the pH can result in $NO_x$ emissions from residual nitrites in solution, which will be subsequently entrained by the air purge and re-scrubbed per Equation 9 by the secondary scrubber solution in vessel 11'. At completion of the salts-hydroxide neutralization process with vessel 10', vessel 11' can be moved up to primary reaction vessel with appropriate valve sequencing and plumbing. Vessel 10' can then be drained and refilled with untreated scrubber waste to serve as the secondary vessel for the primary vessel 11'.

As illustrated in FIGS. 1a, 1b and 2, the liquid fertilizer can be extracted from the reactors after completion of the reaction and verified by pH measurements and the presence of nitrites and/or sulfites with appropriate known analytical techniques which need not be described here because they will be within the knowledge of one of ordinary skill.

The best mode for carrying out the process is presently contemplated to be a series of batch units or a gas-liquid contacting tower. Secondary waste units in series with a primary unit provide a precautionary step to mitigate any $NO_x$ releases which might result from the primary treatment vessel during oxidation and neutralization. Although releases of $NO_x$ should be minimal in accordance with the present invention, this additional precaution against exposure is recommended for both safety and also to maximize the efficiency of ozone usage if the two-step treatment process is implemented as described herein. A continuous flow absorption system could likewise be used to implement this invention.

Figure 3:
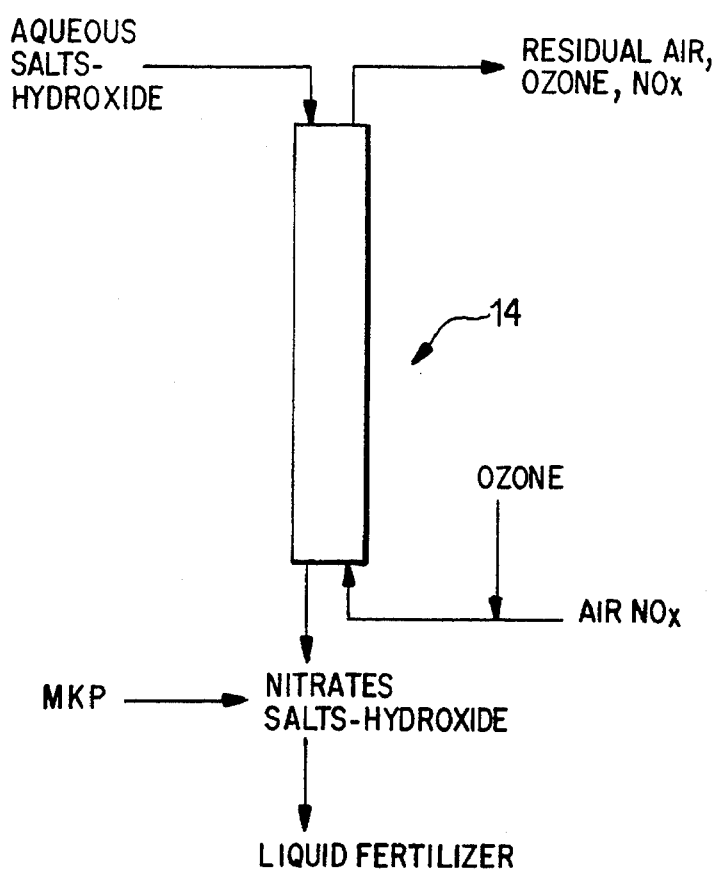
FIG. 3 is a schematic view of a continuous flow gas-liquid contacting column for oxidizing and neutralizing scrubber liquid wastes.

FIG. 3 illustrates a gas-liquid contacting device designated generally by numeral 14 which reacts the $NO_x$-containing gas stream with the salts-hydroxide containing liquid stream. The gas stream is joined with an air and ozone stream prior to the column inlet. The $NO_x$ will react with the salts hydroxide according to Equation 9 above, forming nitrites in the down-flowing liquid stream. The nitrites will then react in the contacting device with the ozone per the oxidation reaction of Equation 1 above to form nitrates in solution. The resulting scrubber liquor can then be collected and neutralized with MKP per Equation 3 above. The addition of ozone to the gas-phase stream will also aid in the oxidation of the gas-phase $NO_x$ species (namely, NO and $NO_2$) per Equations 7 and 8 above to higher order oxides, thereby increasing the solubility of the species is in the aqueous stream. The residual $NO_x$, ozone and air carrier stream could be further processed by feeding to batch scrubber or additional gas liquid contacting towers or batch scrubbers such as those in FIGS. 1b and 3 to achieve the desired $NO_x$ effluent concentration. It is also recommended to validate the $NO_x$ emissions from the specific process utilizing the present invention. One known method for doing so is described by Saltzman, "Colorimetric Microdetermination of Nitrogen Dioxide in the Atmosphere," Analytical Chemistry Vol. 26, pp. 1949–54 (1954) which is sensitive to sub-ppm levels of $NO_x$.

Oxidation and neutralization processes have been performed on waste containing up to 10 weight percent $NaNO_2$ and 10 weight percent NaOH. The initial waste was poured into a reactor, sealed, agitated, and purged via a sparge tube. The system was sparged with air or nitrogen in the case of the single-step hydrogen peroxide-MKP process (FIG. 1), and an ozone (1%)-air purge for the ozone-MKP process (FIG. 2). The effluent from the reactor was then sparged through a secondary vessel to either measure the concentration of $NO_x$ or to absorb any $NO_x$ emissions by additional caustic scrubber solution which could then subsequently be treated following the same detoxification process. The actual flow rate of the sparge gas is dependent upon the desired concentration of $NO_x$ in the effluent which is permitted by local and federal regulations. Temperatures for the oxidation-neutralization processes are that of ambient, between 50 and 100 degrees F.

Figure 4A:
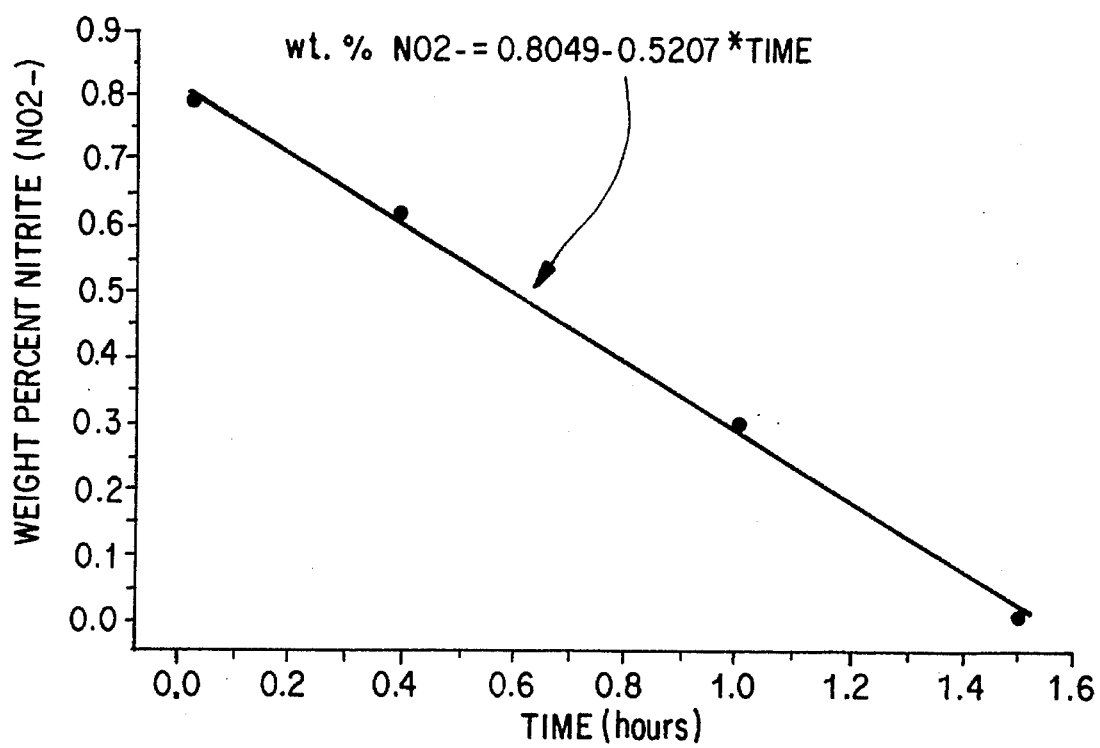
FIG. 4a is a graph showing $NO_2$ concentration as a function of time for a nitrite-containing waste solution.
Figure 4B:
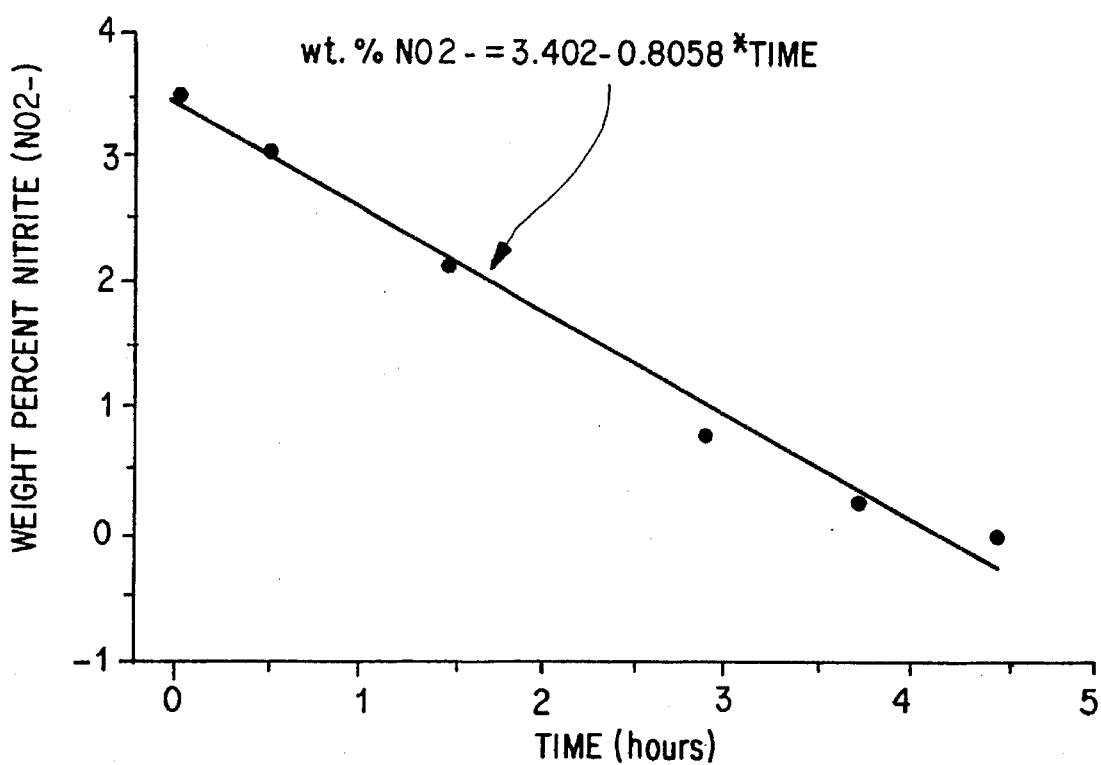
FIG. 4b is a graph similar to FIG. 4a with a different waste solution.

Nitrite oxidation efficiencies greater than 99.0% were typically achieved with the ozone-MKP process of FIG. 2, with ozone usage efficiencies of 35% at 5 to 8 scfh air. The oxidation rates were measured to be 0.25 moles $NO_2^-$ per liter per hour (0.1 pounds $NO_2^-$ per gallon per hour). As an example of the kinetics for the oxidation reaction (Equation 1), FIG. 4a shows the decrease in $NO_2^-$ concentration as a function of time for a nitrite-containing waste solution of 10 weight percent NaOH and initial concentration of $NO_2^-$ of 0.82 weight percent. The feed rate of ozone to the reactor containing 150 cubic centimeters of waste solution was 0.05 g-moles ozone per hour, and the final conversion of nitrite to nitrate was 98.7% after 1.5 hours. FIG. 4b shows another waste oxidation process starting with a 3.5 weight percent solution of $NO_2^-$. The oxidation reaction and conversion of nitrite to nitrate was 99.8% after 4.5 hours.

For the hydrogen peroxide oxidation-MKP neutralization process of FIG. 1, $NO_2^-$ was converted to $NO_3^-$ at a rate (moles $NO_2^-$ per liter per hour) of 0.656 times the concentration of $NO_2^-$ in moles-per liter. The oxidation reaction was found to be approximately first order with respect to the nitrite concentration. Final conversion efficiencies of the nitrite to nitrate were 97–99%.

Figure 5:
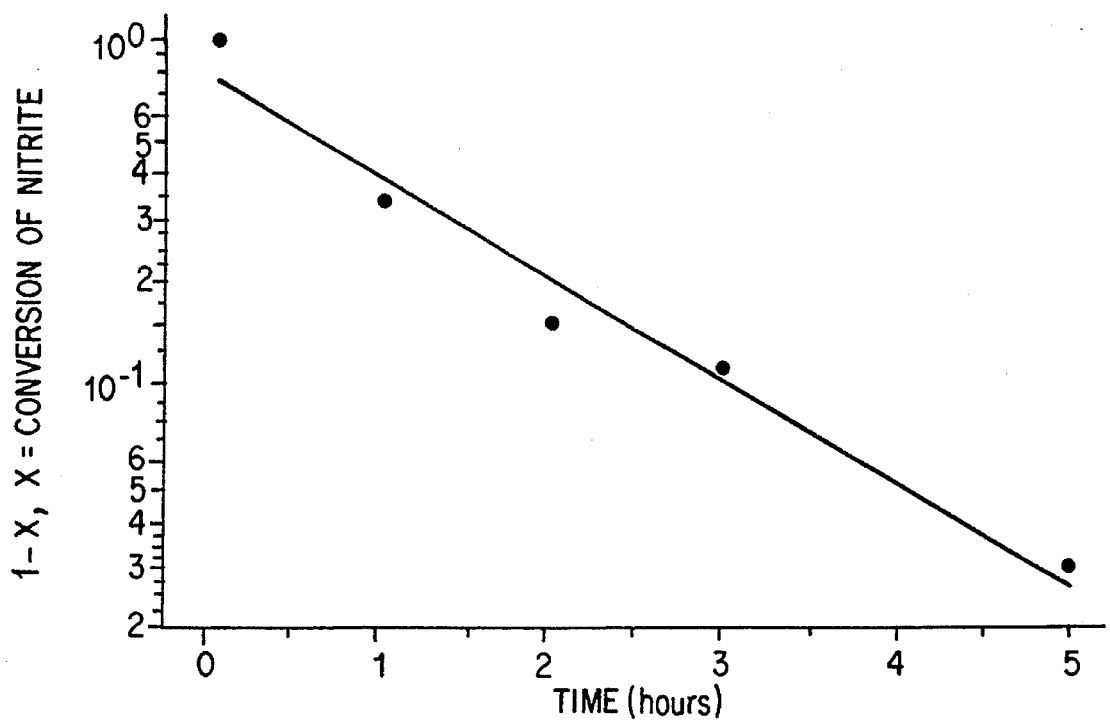
FIG. 5 is a graph of nitrite-conversion profiles when oxidized by hydrogen peroxide.

FIG. 5 shows the nitrite-conversion profiles for the oxidation of nitrite in caustic waste using hydrogen peroxide when hydrogen peroxide and MKP are mixed with the nitrite-containing waste in the proportion of 10 moles hydrogen peroxide to 1 mole $NO_2^-$ and 1.25 moles MKP per mole of NaOH (or, equivalently, $OH^-$).

Figure 6:
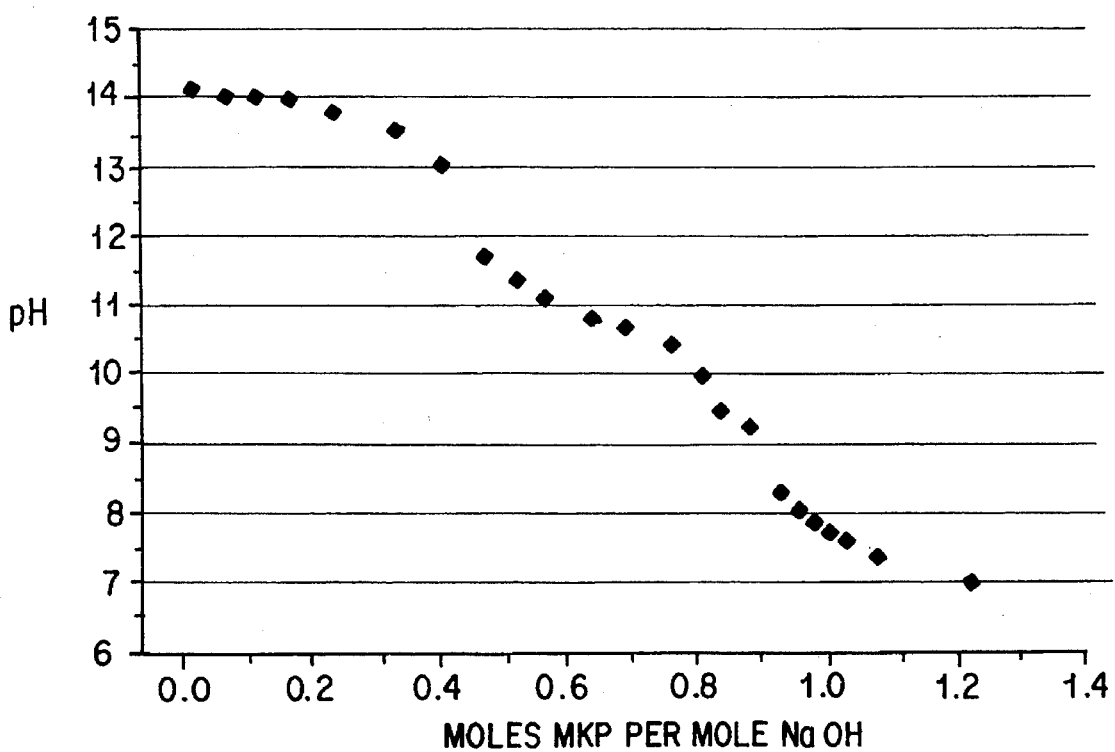
FIG. 6 is a graph showing the neutralization process with MKP.

The neutralization process using MKP and the expected pH for both the ozone oxidation process (FIG. 2) and hydrogen peroxide oxidation process (FIG. 1) in relation to moles MKP per mole NaOH is illustrated in FIG. 6.

EXAMPLE 1

Ozone Oxidation and MKP Neutralization

The ozone oxidation and neutralization of a waste liquor containing 10 weight percent NaOH, 3.9 weight percent $NO_2^-$, and 5.2 weight percent $NO_3^-$ was performed. The total weight of the waste solution was 175.4 grams, at a density of 1.19 g/cm$^3$, and the temperature was 75° F. The solution was contained in a reactor fitted with thermocouples and sampling ports so as to monitor the reaction progress. An impeller and sparge tube was fitted to the system as shown in FIG. 1b, and the waste conversion process was initiated by purging with a stream of air at 8 scfh containing ozone at a partial pressure of $1.0 \times 10^{-2}$ atm. The impeller Reynold's number for the test was 4,300. After 4.5 hours of operation the conversion of nitrite to nitrate was 99.8%, and the final concentration of the waste solution was 10.4 weight percent $NO_3^-$ in the 10 weight percent NaOH solution at a pH of 13.5. The total ozone used for the oxidation process relative to that fed to the reactor was 35.2%. By attaching an additional NaOH solution to the effluent of the reactor during air/ozone purge, the average $NO_x$ concentration evolved during the test was measured via Saltzman's method and found to be less than 0.002 pm (volume).

Following the oxidation step, MKP in the proportions of 4.2 lb per gallon of waste was added to the waste solution to drop the pH to 7.8. The measured $NO_x$ emissions for the process was equivalent to 0.008 ppm (volume). The resulting waste solution in this example had a final fertilizer rating N-P-K of 2-20-13.

EXAMPLE 2

Ozone Oxidation

The ozone oxidation and neutralization of a waste liquor containing 10 weight percent NaOH, 0.82 weight percent $NO_2^-$, and 1.1 weight percent $NO_3^-$ was performed. The total weight of the waste solution was 169.5 grams, at a density of 1.13 g/cm$^3$, and the temperature was 50° F. The solution was contained in a reactor fitted with thermocouples and sampling ports so as to monitor the reaction progress. The waste conversion process was carried out with a 5 scfh air purge containing 1.2% ozone by volume. The impeller Reynold's number for the test was 2,150. After operating the process for 1.3 hours, the conversion of nitrite to nitrate was 98.1% and the final concentration of the waste solution was 2.2 weight percent $NO_3^-$ in the 10 weight percent NaOH solution. The total ozone used for the oxidation process relative to that fed to the reactor was 22.2%, and the average effluent $NO_x$ concentration was less than 0.008 ppm by volume.

EXAMPLE 3

Hydrogen Peroxide Oxidation and MKP Neutralization

The single-step hydrogen peroxide oxidation and MKP neutralization of a waste liquor containing 10 weight percent NaOH, 3.9 weight percent $NO_2^-$, and 5.2 weight percent $NO_3^-$ was performed at room temperature. The total weight of the waste solution was 175.4 grams, at a density of 1.19 g/cm$^3$. The starting pH of the solution was 13.5. The waste solution was poured into a reactor fitted with a sparge connection and effluent port connected to a Saltzman solution to measure the evolved $NO_x$. Hydrogen peroxide was added to the system in the proportion of 10 moles per mole $NaNO_2$, and MKP was added in the proportions of 1.5 moles MKP per mole of NaOH. After adding these reactants, the vessel was sealed, agitated, and purged at 42.5 liters (STP) per hour air. After 3 hours, the conversion of nitrite to nitrate was 89%, and after 5 hours, the conversion reached 97%. The final pH of the waste solution was 6.3, with a fertilizer rating of 1-12-8. By way of established analytical techniques and the Saltzman colorimetric method, the average effluent concentration of $NO_x$ during the course of the test was 1.5 ppm (volume). This concentration could be further diluted by increasing the air purge rate through the system during the test.

The following examples are scaled-up from smaller scale experiments based on reaction and process variables such as the oxidation rates and reactant proportions illustrated in FIGS. 4a, 4b, 5 and 6, as well as dimensionless quantities such as impeller Reynold's number.

EXAMPLE 4

The oxidation and neutralization of nitrite waste with hydrogen peroxide and MKP is carried out in a single batch step. The initial NaOH content of the waste is measured via standard acid-base titration techniques, and the initial nitrite content can be determined by the aforementioned method described by Saltzman. Ten gallons of waste with 10 weight percent $NaNO_2^-$ (approximately $14.2 \times 10^{-3}$ lb mole $NO_2^-$/gallon) and equal parts of $NaNO_3$ are placed in a reaction vessel containing 10 weight percent NaOH. The vessel is sealed and agitated with an impeller Reynolds number (see, Oldshue, "Fluid Mixing Technology" (McGraw-Hill 1983) of 5000, and sparged with 10 scfh compressed air. Hydrogen peroxide is added to the vessel at 10 moles hydrogen peroxide to 1 mole of $NO_2^-$ (7.4 pounds hydrogen peroxide per pound of $NO_2^-$), and then MKP is added at approximately 1.25 moles per mole of NaOH contained in the waste. With pH monitoring, the total amount of MKP should be added in increments so as not to drop below a pH of 7. At measured oxidation rates for this process, the waste is oxidized in approximately 7 hours, and the resulting fertilizer rating (N-P-K) for this example is 2-12-8.

EXAMPLE 5

The oxidation and neutralization process using ozone and then MKP is carried out in a dual step method. The initial NaOH content of the waste is measured via standard acid-base titration techniques, and the initial nitrite content is determined by the aforementioned Saltzman method. Fifty gallons of waste with 2 weight percent $NaNO_2$ (approximately $2.92 \times 10^{-3}$ lb mole $NO_2^-$/gallon) equal parts of $NaNO_3$, and 10 weight percent NaOH are placed in a reaction vessel. The vessel is sealed and agitated with an impeller Reynolds number of 2200 or greater, and sparged with an air/ozone stream from a commercial ozone generator operating at 400 pounds $O_3$ per day (0.35 pound-moles of ozone per hour). The processing time for this operation is approximately 1 hour. MKP is then added to neutralize the waste at approximately 1.25 moles per mole of NaOH contained in the waste. Where pH monitoring is possible, the total amount of MKP should be added in increments so as not to drop below a pH of 7. The resulting fertilizer rating (N-P-K) for this example is 1-16-10.

Similar examples can be provided for sulfite oxidation and waste solutions neutralization based upon oxidation data already available as seen, for example in J. Hoigne, H. Bader, W. R. Haag and J. Staehelin, Rate constants of reactions of ozone with organic and inorganic compounds in water, Water Res., 19(8), p 993–1004, 1985. The oxidation rates of sulfite-to-sulfate are much higher than the above rates for nitrite-to-nitrates and will be understood by one skilled in the art in light of the above disclosure.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for treating a basic aqueous solution comprising a hydroxide and at least one of a nitrite salt or sulfite salt, said process comprising the step of reacting ozone with the waste solution to oxide the anions of the salt.

2. The process according to claim 1, wherein the solution is neutralized with monobasic potassium phosphate after the oxidation step.

3. The process according to claim 2, wherein the process is a batch process.

4. The process according to claim 2, wherein the process is a continuous process.

5. The process according to claim 1, wherein the oxidation step occurs in a primary reactor to which is connected an additional reactor for scrubbing $NO_x$ emissions.

6. The process according to claim 5, wherein the solution is neutralized with monobasic potassium phosphate after the oxidation step.

7. The process according to claim 1, wherein the oxidation step occurs in an continuous flow absorption column with an air-ozone mixture constituting a gas phase and the waste scrubber solution constituting a counter flowing liquid phase.

8. The process according to claim 1, wherein the ozone is introduced into an $NO_x$ scrubber stream.

9. A process for treating a basic aqueous solution comprising a hydroxide and at least one of a nitrite salt or sulfite salt, said process comprising the step of reacting hydrogen peroxide and monobasic potassium phosphate with the waste solution to oxidize the anions and neutralize the hydroxide, respectively.

10. The process according to claim 9, wherein the oxidation step occurs in a primary reactor to which is connected at least one additional reactor for capturing $NO_x$ emissions.

11. The process according to claim 9, wherein the oxidation and neutralization reactions occur in a primary vessel and $NO_x$ emissions are one of trapped in a separate scrubber vessel containing untreated scrubber waste and directed to an $NO_x$ scrubber tower.

12. The process of producing a liquid fertilizer comprising potassium and phosphorus wherein monobasic potassium phosphate is used to neutralize a basic aqueous solution.

* * * * *